A. E. HALL & G. H. FRASER.
ELECTRIC PUMP.
APPLICATION FILED DEC. 28, 1901. RENEWED APR. 17, 1915.
1,161,385.
Patented Nov. 23, 1915.
3 SHEETS—SHEET 1.
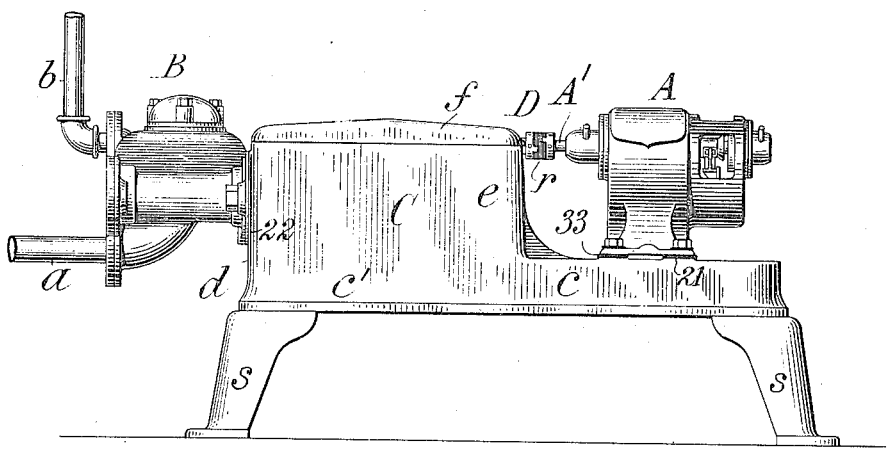
FIG. 1.
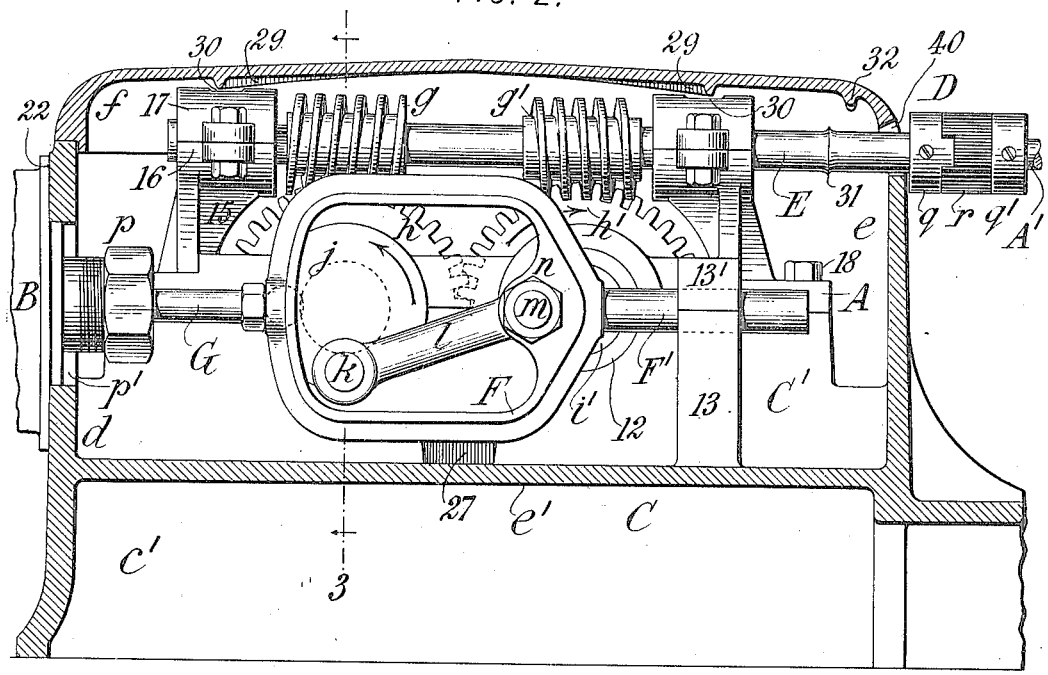
FIG. 2.
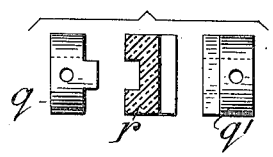
FIG. 11.    FIG. 12.    INVENTORS:
Albert E. Hall and George H. Fraser,
By Attorneys,
WITNESSES:

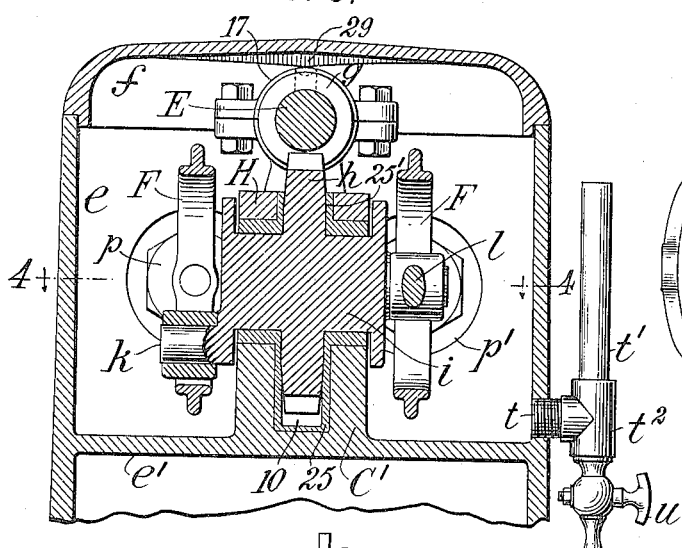
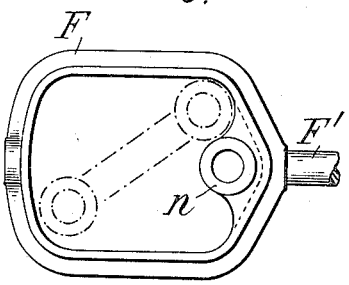
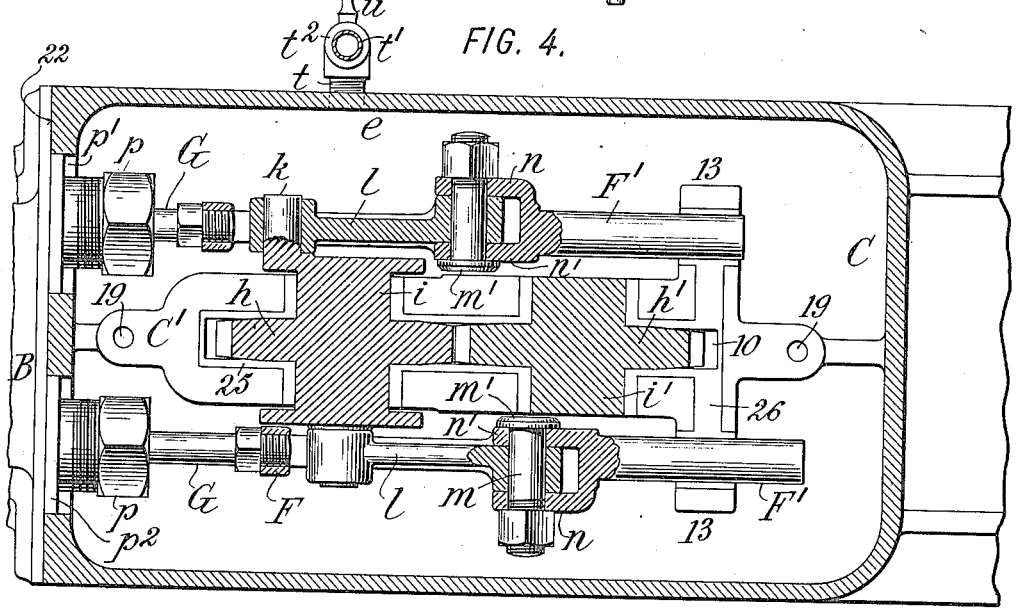
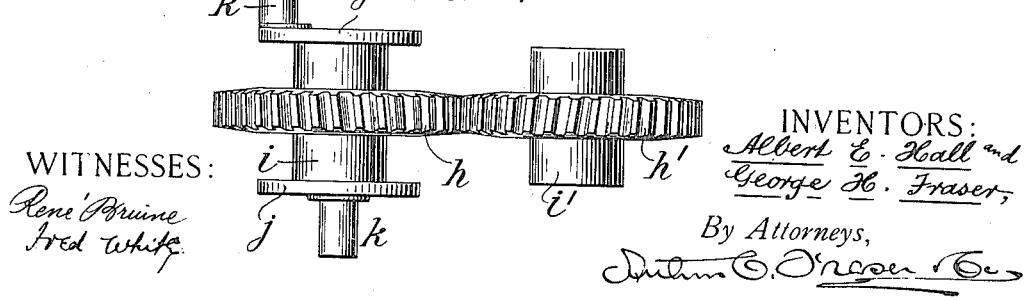

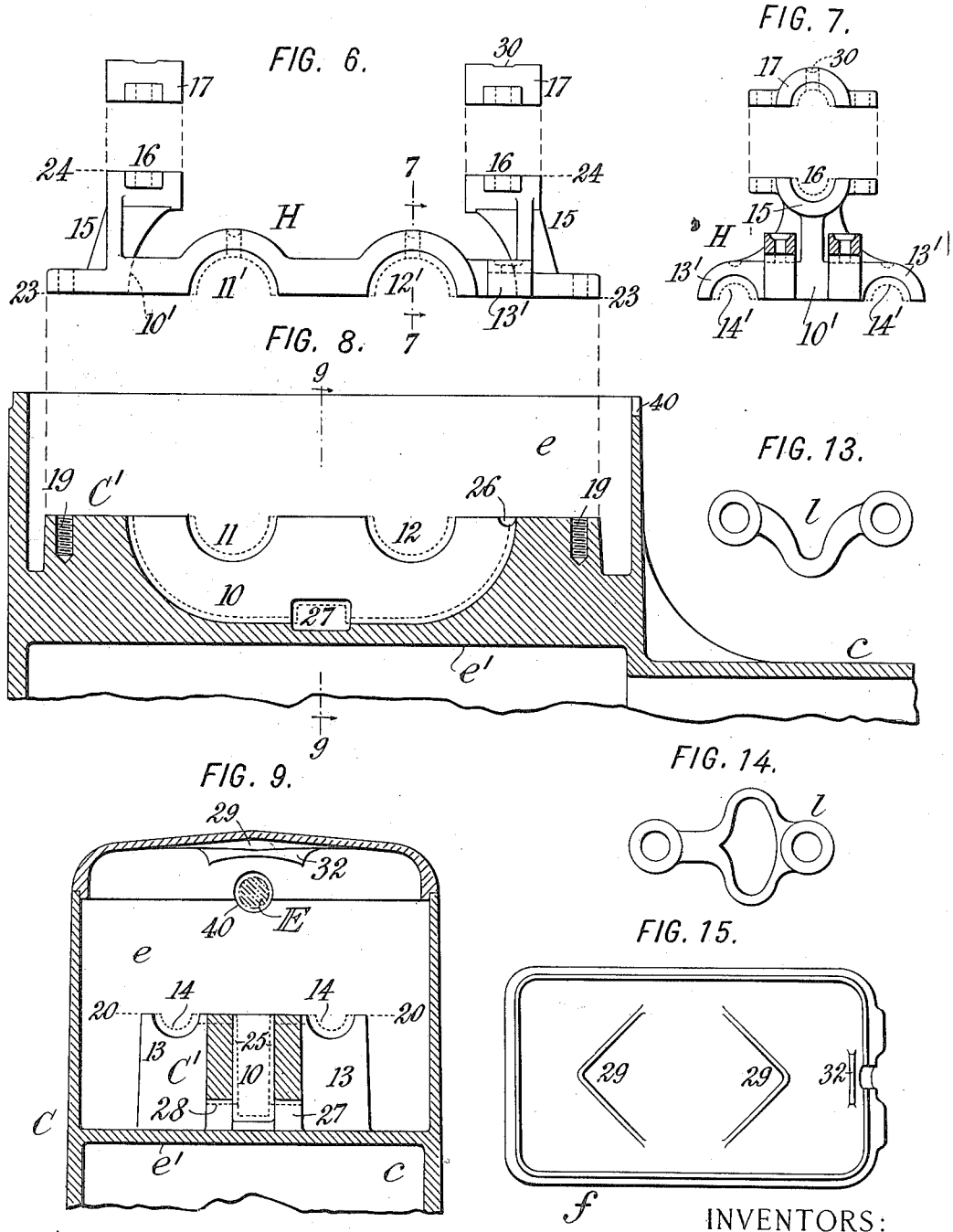

UNITED STATES PATENT OFFICE.

ALBERT E. HALL, OF PLAINFIELD, NEW JERSEY, AND GEORGE H. FRASER, OF NEW YORK, N. Y., ASSIGNORS, BY DIRECT AND MESNE ASSIGNMENTS, TO AUTOMATIC ELECTRIC PUMP COMPANY, OF NEW YORK, N. Y., A CORPORATION OF NEW YORK.

ELECTRIC PUMP.

1,161,385.   Specification of Letters Patent.   Patented Nov. 23, 1915.

Application filed December 28, 1901, Serial No. 87,586. Renewed April 17, 1915. Serial No. 22,192.

*To all whom it may concern:*

Be it known that we, ALBERT E. HALL, a citizen of the United States, residing at Plainfield, in the county of Union and State of New Jersey, and GEORGE H. FRASER, a citizen of the United States, residing in the borough of Brooklyn, county of Kings, city and State of New York, have jointly invented certain new and useful Improvements in Electric Pumps, of which the following is a specification.

This invention relates to mechanism whereby to operate a reciprocating pump from an electric motor. It is desirable to drive such pumps at slow speed from a motor rotating at high speed, for which purpose an interconnecting mechanism is necessary to convert the rapid rotation of the motor into the desired slow reciprocation of the pump.

Our invention aims to provide a connecting mechanism the construction of which shall be cheap and simple, and such that the mechanism shall be self-lubricating and operate with the minimum of friction, and shall require attention only at the most infrequent intervals.

According to our invention we interpose between any suitable reciprocating pump and any suitable electric motor, a mechanism comprising an inclosing case or box having within it bearings for the moving parts, a worm-shaft, which may be a prolongation of the armature shaft, or preferably may be coupled or otherwise connected thereto, the worms on said shaft being respectively of right and left pitch, two worm-wheels meshing with the respective worms and with each other, a crank or cranks on the shaft of one of said worm-wheels, and a yoke or yokes moving in line with and connected to said pump piston rod or rods, and coupled to such crank or cranks to be reciprocated thereby. The chamber within which these moving parts are inclosed constitutes an oil chamber, whereby the moving parts may be largely submerged in oil, and thereby effectually lubricated.

Our invention comprises certain features of improvement which will be fully hereinafter set forth.

The preferred embodiment of our invention is that shown in the accompanying drawings, wherein, Figure 1 is a side elevation on a reduced scale of the entire mechanism showing the electro-motor A, the pump B, and the interposed connecting frame or shell C which supports the motor and pump and incloses the interconnecting mechanism; Fig. 2 is a vertical longitudinal section of the shell or casing, the upper part being cut in the plane of the axis of the armature shaft, and the lower part in the plane of the axis of the nearer rod of the pump, the inclosed mechanism being shown in elevation; Fig. 3 is a vertical transverse section on the line 3—3 of Fig. 2 and looking toward the pump end; Fig. 4 is a horizontal section cut in the plane of the axes of the pump pistons as indicated by the line 4—4 in Fig. 3; Fig. 5 is a fragmentary detail of one of the yokes; Fig. 6 is a side elevation of the inner bearing frame with its bearing caps lifted off; Fig. 7 is a cross-section thereof on the line 7—7; Fig. 8 is a vertical longitudinal midsection of the inclosing shell, the other parts being removed; Fig. 9 is a transverse section of said shell and its cover on the line 9—9 in Fig. 8 looking toward the motor end; Fig. 10 is a plan of the gear wheels removed; Fig. 11 shows the parts of the clutch detached, Fig. 12 being a face view of the middle section thereof; Figs. 13 and 14 show two different forms of frangible link; Fig. 15 is an under side view of the cover on a reduced scale.

The electric motor A and pump B may be of any suitable or known constructions. The pump is shown as a duplex reciprocating pump, *a* being the suction pipe and *b* the discharge. The particular internal construction of the pump forms no part of our invention, and need not be described.

The connecting frame or shell C is of suitable construction to serve primarily as a support for the motor and for the pump, as well as for their inter-connecting mechanism. It is also constructed to inclose this mechanism so as to protect it from dust or injury and to provide a lubricating chamber whereby the working parts may be largely immersed in oil. For performing the first of these functions, it is constructed with a base portion or plate $c$ on which the motor A is mounted, and which may extend as shown at $c'$ the entire length of the frame or casting, and which at its opposite end has an upright portion or wall $d$ against which the pump B is bolted. For performing the second function the frame C is constructed between the pump and motor as a box $e$ having an open top closed normally by a cover $f$. Within the box $e$ are formed certain bearings which may be partly integral with the main frame or casting C, as will be described.

We will now describe the inter-connecting mechanism whereby the rapid rotation of the motor is converted into a slow reciprocatory movement for driving the pump. The armature shaft $A'$ of the motor is connected by any suitable coupling means, such for example as the coupling D, with the wormshaft E, on which are formed two right and left worms $g$ $g'$ of equal pitch. Meshing with these worms, and preferably arranged beneath them, are two worm-wheels $h$ and $h'$ which are in mesh with one another. It follows from this arrangement that the end thrust of each of the worms is taken up through the two wheels, so that each worm reacts against the other, thereby neutralizing all end thrust upon the shaft E, as is well understood. The wheels $h$ $h'$ are formed with shafts or journals $i$ $i'$, on either of which are mounted cranks $j$ $j$ having crank studs $k$ $k$ arranged preferably the one 90 degrees in advance of the other. We have shown the cranks $j$ as disk cranks, and as fixed on the ends of the shaft or journal $i$, but they may be any other form of crank, and they may be fixed on the shaft $i'$ if preferred. The crank studs $k$ are connected to drive yokes F F, which in turn are connected to the piston rods G G of the duplex pump B. The yokes F are each united at one end to the piston rod G, and provided at the other end with a sliding guide alined in parallelism with the axis of the rod G, this guide being preferably a rod $F'$ sliding in any suitable bearing. The connection from the crank stud $k$ to the yoke F may be any suitable or known connection, but is preferably effected through the medium of a link or connecting rod $l$ having eyes at opposite ends, one of which encircles the stud $k$, and the other of which encircles a pivotal bolt $m$ which passes through ears $n$ $n'$ formed on the yoke F, being secured by a nut as shown or otherwise.

It will be observed that by our mechanism we arrange the axes of the pump piston rods G G in substantially the same plane with and preferably intersecting the axes of the wheels $h$ $h'$, and consequently parallel with the worm-shaft E. This is an advantageous arrangement whereby the several bearings are brought into parallelism, and the bearings for the guide rods $F'$ have their axes in the same planes as those for the journals $i$ $i'$. The arrangement also permits of using a motor with a horizontal armature shaft and a horizontal pump, and permits of placing these at opposite ends of the interconnecting mechanism so as to leave the latter readily accessible between them, and avoids the objectionable vertical arrangement of the pump whereby it must either be located below the driving mechanism where the latter obstructs access to its stuffing boxes $p$ $p$, or above the driving mechanism where it interferes with the accessibility of such mechanism. With our arrangement, the mere lifting off of the cover $f$ discloses the entire driving mechanism and enables all its parts to be readily reached. It is advantageous to drive the pump piston rods by cranks carried by only one of the wheels $h$ $h'$ instead of both, as thereby not only is the utmost simplicity attained, but the thrust communicated through one wheel to the other is constantly in the same direction, thereby avoiding back lash and noise. For the same reasons it is preferable to drive both rods G from cranks on the same wheel, instead of the one from a crank on one wheel and the other from a crank on the other wheel.

According to our preferred construction we form the lower bearings for the shafts $i$ $i'$ and guide rods $F'$ $F'$ integrally with the main frame C or box $e$. To this end we form this frame with a projecting portion or bearing frame $C'$ within the box $e$ and projecting upward from the bottom $e'$ thereof, as shown best in Figs. 3 and 9. This projection $C'$ is cast with a chamber 10 extending along the medial line of the apparatus, this chamber being designed to receive the wheels $h$ $h'$. Branching laterally from this chamber are depressions 11 and 12 (Fig. 8) designed to form bearings for the gear shafts $i$ $i'$. At one end the projection $C'$ is widened forming portions 13, 13, in the tops of which are depressions 14, 14, designed to form bearings for the guide rods $F'$. Directly over the projection $C'$ is fastened a frame H, preferably a casting, which has a longitudinal central opening $10'$ overlying and corresponding to the chamber 10, and adapted to receive the wheels $h$ $h'$; it is formed on its under side with recesses $11'$ and $12'$ (Fig. 6) overlying the recesses 11 and 12 to complete the bearings for the shafts $i$ $i'$; it is also formed at one end with lateral projections $13'$ (Fig. 7) having recesses $14'$ overlying the recesses 14, 14, to complete the bearings for the guide rods $F'$. It is also formed with upwardly projecting brackets 15, 15, which support the lower halves of the bearings 16, 16, for the wormshaft E; the upper halves of these bearings are constituted by caps 17, 17, (Figs. 6 and 7). The frame H is bolted down to the projection or bearing-frame C′ by end bolts 18 entering holes 19, 19; and the caps 17, 17, are suitably bolted down to the brackets 15. The shaft E has no end thrust bearings, since the end thrust is taken up through the intermeshing gears $h$ $h'$ as described.

Our improved construction enables the several bearings to be very cheaply and accurately finished. It is only necessary to plane off the top of the frame C′ as denoted by the line 20—20 in Fig. 9, which may conveniently be done during the same mounting of the casting C in the planer at which the bearing faces 21 for the motor A and 22 for the pump B are planed; the casting H requires only that its bottom and top faces be planed, as denoted by the lines 23 and 24 (Fig. 6,) the bottom faces of the bearing caps being also planed. The holes $p'$ $p'$ in the end of the box $e$ for receiving bosses $p^2$ $p^2$ on the pump have to be bored out, with their centers coinciding with the plane of the top 20—20 of the projection or bearing-frame C′, and laterally equidistant or approximately so from the center line of the chamber 10. No other finish for any of these castings is necessary, since all the bearing surfaces are formed by babbitting. To accomplish this a suitable jig is fitted upon the frame C′ so as to enter the chamber 10 and depressions 11, 12 and 14, the jig being guided laterally by the holes $p'$ and located longitudinally in exact relation to the planed face 22; whereupon at a single casting of the babbitt the latter is caused to fill the spaces between the frame C′ and the jig, thereby forming a babbitt lining 25 for the chamber 10, and also babbitt linings as usual for the bearings 11, 12 and 14, as denoted by dotted lines in Figs. 8 and 9.

Any slight irregularities in the casting are compensated for by the babbitt, which may be of unequal thickness at different portions. Thus the babbitted bearings are in fixed and absolute relation to the pump with which the mechanism is to coact, perfect alinement and correct spacing being secured at one operation, by utilizing, for the purpose of positioning the jig, the same holes $p'$ with which the projections $p^2$ on the pump are to register. The babbitt reaches the bearings 14 by flowing through lateral grooves or gates 26. The casting H is then babbitted in similar manner, so that the babbitt forms a lining 25′ (Fig. 3) for its recess 10′ and also lines the upper bearings 11′, 12′, 14′. The bearings 16, 17 are also babbitted in any usual manner. The babbitt lining 25, 25′ makes a close working fit with the side faces of the wheels $h$ $h'$ so as to receive any end thrust of these wheels, thereby avoiding the necessity of providing any end thrust bearing faces on the exterior of the bearings 11, 12, as would ordinarily be provided, and thereby avoiding the necessity for planing or finishing the outer faces of the projection C′. The inner surfaces of the babbitt linings 25, 25′ are made tapering, and the outer faces of the wheels $h$ $h'$ are also made tapering, whereby to facilitate drawing the jig and inserting the wheels into place. The taper of the lining however is interrupted adjacent to the teeth of the wheels, as clearly shown in Figs. 3 and 4, so that the toothed portions of the wheels turn in a clear or free space.

It will be understood that the pump B is bolted to the wall $d$ so as to make a leak-tight connection around the holes $p'$ through which its stuffing boxes $p$ enter the interior of the box $e$, so that this box may be filled with oil to a level considerably above these holes, and limited only by the level of the hole 40 at the end through which the shaft E passes out. Thus the working parts are largely submerged in oil, and this oil is kept in constant agitation by reason of the rotation of the gear wheels and cranks and the reciprocating movement of the yokes F F. Preferably the wheels turn in the direction of the arrows in Fig. 2, so that the oil, the level of which preferably is above the base plate of the casting H, so that it may freely enter the chamber 10, is swept down by the teeth of the gears at the ends of this chamber and toward the middle of the chamber, where, to provide the oil a free exit (since its upward escape is largely prevented by the intermeshing of the gear teeth), we provide a lateral channel 27 through the side walls of the projection C′, and preferably just above the floor $e'$ of the oil chamber, so that the oil is caused to flow out laterally through this passage 27, which has the advantage that it carries with it any dirt or sediment which otherwise would be apt to lodge in the bottom of the chamber 10, so that this sediment can precipitate on the bottom of the oil chamber where there is less circulation. The passage 27 preferably passes from the central chamber 10 to both sides, although it would suffice if it passed to one side only. This lateral passage has another function, in that it serves as a tie or clench for the babbitt, which is permitted to flow under it as indicated at 28 in Fig. 9.

We provide for automatically oiling all portions of the mechanism, and at the same time for preventing accidental escape of oil through the opening 40 by which the shaft E passes out. The worms are of course oiled by oil carried up on the teeth of the gear wheels, while the working parts beneath will ordinarily be immersed in oil. The bearings 16, 17 for the worm-shaft E are consequently the only parts that require special oiling provisions. For automatically introducing oil into these bearings, we provide the cover $f$ on its under side with ribs 29, 29, preferably of the shape shown in Fig. 15, which extend back angularly against the sloping under face of the lid so as to intercept the oil oozing down that face and direct it to the lowest point or teat at the apex of each V-shaped rib, from which point the oil will drop onto the bearings. These teats come directly over recesses 30 in the bearing caps 17, which recesses form basins for catching the oil, and from which an oil duct leads down onto the bearing. The rapid rotation of the worms, as well as the agitation caused by the reciprocating mechanism, throws sufficient oil against the cover $f$ to supply oil to the worm-shaft bearings by the described action of the ribs 29. To prevent oil being carried along on the shaft E toward the coupling D, this shaft is formed with an annular flange 31 which centrifugally throws off the oil. To prevent oil running down the cover $f$ from dropping onto the shaft E beyond this flange, we provide the cover with an internal flange 32 (best shown in Fig. 9) the lower edge of which slopes both ways to points located at opposite sides of the shaft, so that the oil drops from these points and does not fall onto the shaft.

The chamber within the box $e$ holds a large quantity of oil, sufficient to lubricate the parts for a long period, say for one or more years. At starting, the oil should be introduced to a level somewhat above the axis of the piston rods G; in course of time a small leakage of water will usually occur from the pump through the stuffing box $p$, whereby the oil will be gradually elevated, and eventually it would run out at 40 around the shaft E. We provide a tell-tale for detecting the rise of the oil before it reaches this level, and we provide also a drainage-cock whereby the water may be drained off. As shown in Fig. 4, a pipe or thimble $t$, is tapped into the side of the box $e$ just above its bottom, to which is connected, as by a suitable union $t^2$ an upright pipe $t'$, the open upper end of which is arranged at a lower level than the opening 40 through which the shaft E passes out, so that the oil will first overflow from this pipe and may fall into any suitable receptacle below. When the user observes that such outflow of oil has occurred, he will then open a drainage-cock $u$ connected beneath the pipe $t$, whereby he may draw off the water. The cross passage 27 permits the water to flow off from both sides of the projection C'. The pipe $t'$ may be of glass if desired, to constitute a level-gage.

The coupling D which unites the shafts A' and E, we construct as a compensating coupling, the construction of which may be varied, it being only essential that it shall admit of some slight want of alinement between the two shafts without affecting perceptibly the transmission of power. In the construction shown the coupling consists of three parts $q\ r\ q'$, the parts $q\ q'$ being fixed respectively on the ends of the shafts E and A', while the part $r$ is a loose piece inserted between them and serving to communicate the rotation from one to the other. The part $r$ has interlocking projections or recesses which engage corresponding recesses or projections in the parts $q\ q'$ respectively, these inter-engaging projections and recesses being so shaped that the part $r$ may accommodate itself within limits to any want of alinement between the terminal parts. In the construction shown this is simply accomplished by forming the part $r$ with diametrical grooves at right angles to one another, as shown in Figs. 11 and 12, the grooves fitting corresponding ribs on the adjoining parts. Any want of alinement is compensated for by the part $r$ sliding along the ribs on the parts $q\ q'$ as it rotates on an axis which ordinarily will be the mean of the two non-coincident axes of the outer parts. This construction facilitates the setting of the motor, and avoids springing of the shaft E and friction of this shaft in its bearings.

It is requisite in an electric pump that the electro-motor be effectually insulated from all other parts of the mechanism, in order that under no probable conditions can the electric current find its way into the pipes or column of water, whereby those touching the pipes or faucets might receive a shock. To this end we interpose an insulating medium 33 between the motor base and the supporting frame C, as shown in Fig. 1. It is also requisite to insulate the armature shaft A' from the shaft E, for which purpose we interpose insulation in any convenient manner in connection with the clutch D. This may be most simply effected by making the middle section or member $r$ of the clutch of insulating material, as indicated in Fig. 1.

It is important in an electric pump to provide some means whereby if the pump becomes clogged or choked, or for any other reason incapacitated, and the electric motor continues to run, the damage to the interposed mechanism may be minimized by the breaking of some readily replaceable part. This we provide for preferably in two ways. As the links or connecting rods $l$ are the smallest parts of the interposed gearing and therefore those most easily replaced, we make these links so as to be easily frangible. This is readily done by weakening them in any suitable direction, so that they will be broken by a thrust greater than the thrust that can be communicated under normal conditions. The frangible link may be a plain straight link, as shown in Fig. 2, weakened in any suitable manner, or preferably it may be made as a bent link, an example of which is shown in Fig. 13, the bent portion being intentionally made weakest so as to localize the fracture. Or it may be a double-bowed link as shown in Fig. 14, the bowed portions being made very thin so as to easily break. As a second means of preventing serious injury, we interpose an easily frangible portion between the motor armature and the worms, preferably in or adjacent to the clutch D. As one means of carrying out this feature of our invention, we may conveniently construct the intermediate section *r* of material so readily frangible that when the pump is blocked and the resistance to the turning of the worms becomes excessive, this part will be easily split off or broken by the torque of the motor armature. To this end we make the section *r* of the clutch of vulcanized fiber, wood, or any material having the necessary degree of frangibility. Preferably we make this section *r* of vulcanized fiber, whereby it is adapted at once to perform three functions, namely, that of a compensating clutch member, that of insulating the armature shaft from the worm-shaft, and that of a frangible member of the clutch.

The yokes F are formed with opposite ears *n n'* as stated, in order to support both ends of the bolt *m*, thereby preventing its springing under strain. This necessitates that the end of the link shall be capable of entering between the ears, and to accomplish this while keeping the yoke as short as possible, we make the yoke wide enough to enable the pivotal end of the link to be swung sidewise into or out of the recess between the ears, so that in assembling the parts the link may be brought to the position shown in dotted lines in Fig. 5, and then swung around its crank stud to bring its opposite end into the space between the ears. The link is made short in order to secure longitudinal compactness, and to enable it to be guided solely by the eye engaged by the bolt *m*, so that no cap or outer flange is required on the crank stud *k*. The bolt *m* has a head *m'* at its inner end which normally just clears the outer face of the projecting frame C' and end of shaft *i'*, whereby in case the nut should work loose the bolt cannot get out of place because its head is stopped against the outer face of the parts C' and *i'*.

The pump base or main frame C may be conveniently supported upon legs *s s*, as shown in Fig. 1, bolted to or suitably attached to it, but this is not necessary.

It will be understood that our invention is susceptible of considerable modification without departing from its essential features. Hence it must not be inferred from the particularity with which we have shown and described the details of construction, that we are to be confined to these details.

It is an important advantage of our pump that the driving mechanism is so arranged that all the thrusts are in parallel lines, and in a duplex pump are symmetrical, whereby the power is exerted in the most direct and efficacious manner, with the minimum of friction and wear.

What we claim is:—

1. A pump driving mechanism comprising a worm-shaft having right and left worms, and two intermeshing worm-wheels engaging said worms respectively, a bearing-frame formed with lower bearings for said wheels and an upper bearing-frame formed at its lower part with upper bearings therefor, and at its upper part with bearings for said worm shaft.

2. A pump driving mechanism comprising a worm-shaft having right and left worms, and two intermeshing worm-wheels engaging said worms respectively, a bearing-frame formed with lower bearings for said wheels and for guiding the piston rod, and an upper bearing-frame formed with upper bearings therefor.

3. A pump driving mechanism comprising a worm-shaft having a worm, a worm-wheel below and meshing with the underside of said worm, and a bearing-frame formed with a chamber receiving said wheel having bearings on opposite sides thereof for the journals of said wheel, said frame having a compartment outside of said chamber.

4. A pump driving mechanism comprising a worm-shaft having right and left worms, and two intermeshing worm-wheels engaging said worms respectively, a bearing-frame formed with a chamber receiving said wheels, and a bottom hole adapted to permit oil swept into said chamber by the teeth of said wheels to escape laterally.

5. A pump driving mechanism comprising a worm-shaft having right and left worms, and two intermeshing worm-wheels engaging said worms respectively, a bearing frame formed with lower bearings for said wheels, and with a bearing for guiding the pump piston-rods, and having conduits for conducting the babbitt to the respective bearings.

6. A pump driving mechanism comprising a worm-shaft having right and left worms, and two intermeshing worm-wheels engaging said worms respectively, a bearing frame formed with lower bearings for said wheels and an upper frame formed with upper bearings therefor, said frames formed with coinciding chambers for receiving said wheels, and babbitt linings therefor.

7. A pump driving mechanism comprising a crank, and a link connecting it to the pump piston-rod, said link constructed to break in case the pump is obstructed and thereby prevent injury to the mechanism.

8. A pump driving mechanism comprising a crank, and a link connecting it to the pump piston-rod, said link constructed as a bent arm and of less strength than the remaining parts, so as to break in case the pump is obstructed and thereby prevent injury to the mechanism.

9. A pump driving mechanism comprising a crank, a sliding member connected to the pump piston-rod, and a link connecting the crank with a pivotal stud on said member, the latter and said link formed the one with an eye receiving said stud and the other with ears supporting said stud and between which the eye on the other is received.

10. A pump driving mechanism comprising a crank, a yoke connected to the pump piston-rod, having ears and a bolt and a link connecting the crank-stud therewith, said yoke inclosing the crank-stud and link, and shaped to permit the link to be swung around the crank-stud to enter it between said ears.

11. A pump driving mechanism comprising a crank, a yoke connected to the pump piston-rod, having a bolt with head, a link connecting the crank-stud to said bolt, and a frame having a face extended parallel to the travel of said yoke, and close to its head to prevent the escape of the bolt if it should become loose.

12. The combination with a pump of a driving mechanism having a supporting frame, said pump and frame having reciprocally-engaging provisions for relatively locating them, and said frame having bearings for the moving parts of said mechanism, adapted to be gaged with reference to said provisions, whereby the correct relative positioning of the parts may be assured, and having a chamber between said bearings and said provisions.

In witness whereof, we have hereunto signed our names in the presence of two subscribing witnesses.

ALBERT E. HALL.
GEORGE H. FRASER.

Witnesses:
THOMAS F. WALLACE,
FRED WHITE.

Copies of this patent may be obtained for five cents each, by addressing the "Commissioner of Patents, Washington, D. C."